United States Patent [19]

Nagashima

[11] Patent Number: 4,753,448

[45] Date of Patent: Jun. 28, 1988

[54] BRAKE APPARATUS FOR BICYCLES

[75] Inventor: Satoshi Nagashima, Souka, Japan

[73] Assignee: Sakae Ringyo Co., Ltd., Tokyo, Japan

[21] Appl. No.: 928,044

[22] Filed: Nov. 7, 1986

[30] Foreign Application Priority Data

Mar. 18, 1986 [JP] Japan .................................. 61-60042

[51] Int. Cl.$^4$ ................................................ B62L 3/02
[52] U.S. Cl. ..................................... 280/264; 74/489;
74/501 C; 188/2 D; 188/24.22; 280/279
[58] Field of Search ................. 188/2 D, 24.12, 24.22;
280/88, 264, 279; 74/501 C, 501 F, 489

[56] References Cited

U.S. PATENT DOCUMENTS 2,903,840  9/1959  Teupel et al. ........................ 74/18.2
4,616,523 10/1986  Jones .............................. 280/264 X
4,653,768  3/1987  Key's et al. .................... 188/24.22 X

FOREIGN PATENT DOCUMENTS 205107 12/1923 United Kingdom ............. 188/24.22

Primary Examiner—George E. A. Halvosa
Attorney, Agent, or Firm—Lowe, Price, LeBlanc, Becker & Shur

[57] ABSTRACT

A rear wheel brake cable arrangement for a free style bicycle comprises a first cable connected between a rear wheel brake lever and a rocking member mounted for swiveling movement to a stem pipe, and a second cable connecting the rear wheel brake mechanism to a vertically movable member coaxially mounted on the stem pipe. Depressing of the rear wheel brake lever causes swiveling movement of the rocking member which moves a pair of links that transmit a uniform force to move the vertically movable member and thereby a rotary member along the stem pipe to cause movement of the second cable connected to the rotary member.

5 Claims, 8 Drawing Sheets

Fig.9

BRAKE APPARATUS FOR BICYCLES

BACKGROUND OF THE INVENTION

1. Field of the invention

This invention relates to a brake apparatus for bicycles and, more particularly, to a brake apparatus for a rear wheel thereof.

2. Prior Art

In general, trick bicycle riding in shows or competition utilizes off-road type bicycles. Recent proposals have been made to provide a so-called "free style bicycle" to allow the ordinary user to enjoy trick riding.

A free style bicycle allows the rider to raise and rotate the front wheel with the handle bar more than once as a form of trick. To this end, front wheel brake cable connected to a brake lever and a brake mechanism on the side of the front wheel has conventionally been adapted to pass through a stempipe, a steering head and a front fork to thus prevent the front wheel brake from being entangled in the stem pipe and the steering head when the front wheel is rotated as above.

On the other hand, the rear wheel brake cable which is connected to a brake lever and the brake mechanism on the side of the rear wheel is solely supported on the bicycle frame and thus becomes entangled in the stem pipe and the steering head when the front wheel is rotated. In order to accommodate this, such a free style bicycle requires the rider to reversely rotate the front wheel whenever the front wheel is rotated in one direction and this of course involves a control problem. If the rear wheel brake cable becomes entangled, a high tensile force is applied not only to the rear wheel cable but also to the connection of the rear brake lever and the rear brake mechanism, possibly resulting in failure of the brake apparatus.

SUMMARY OF THE INVENTION

It is an object of the present invention to provide a brake apparatus for a bicycle having a framework by means of which the rear wheel cable is prevented from being entangled in the stem pipe and the like even when the front wheel is rotated.

The present invention is characterized in that a pair of links one end of which are pivoted to a pair of arms of a rocking member swingably disposed in a stem, a rotary member rotatably mounted over a vertically movable member disposed on a stem pipe, said vertically movable member having the other ends of said pair of said links pivoted thereto, and characterized in that a brake lever for the rear wheel and said rocking member are connected to each other by a first cable for the rear wheel, said rotary member and a brake mechanism for the rear wheel being coupled to each other by a second cable for the rear wheel to thus relatively rotate said rotary member on said vertically movable member when the front wheel is rotated with a handle, and characterized in that said rocking member is swung by lifting said first cable for the rear wheel when said brake lever is operated to upwardly move said vertically moving by said pair of said links said brake mechanism being operated by said second cable for the rear wheel.

DETAILED DESCRIPTION OF THE INVENTION

An embodiment of the present invention will be explained in detail with reference to the accompanying drawings.

Figure 5:
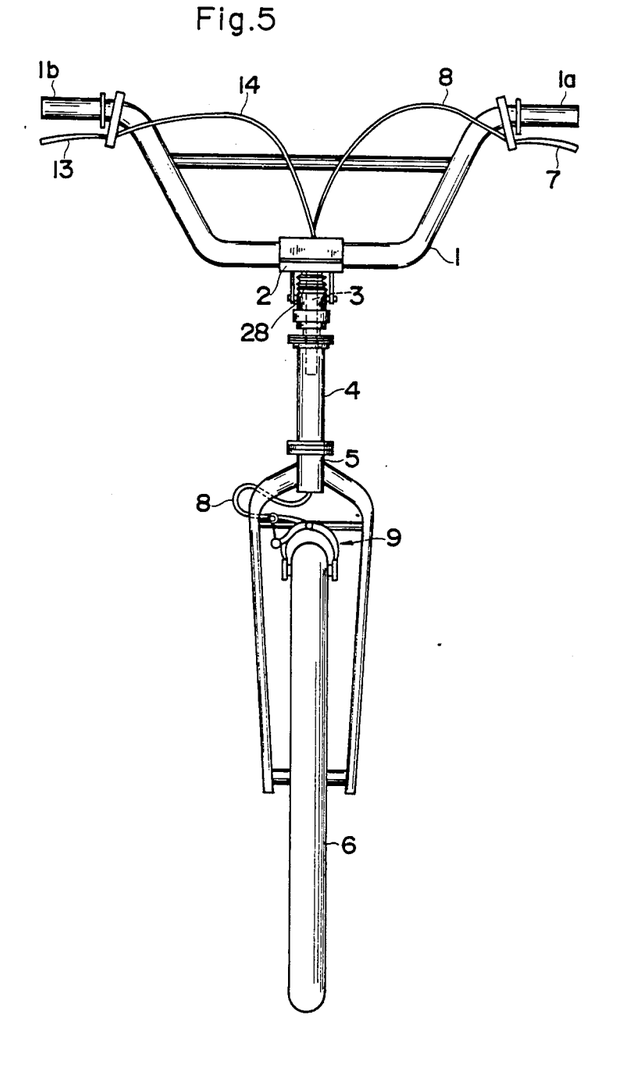
FIG. 5 is a front view of a free style bicycle embodying the invention.

FIG. 5 shows, by way of example, one form of a free style bicycle. The center of a handle bar 1 is stationarily supported by a stem 2 from the underside of which a stem pipe 3 extends. The stem pipe 3 is adapted to have its lower end inserted into a steering head 4 for rotation therein. A front fork 5 is mounted over the steering head 4 from below and connected to the stem pipe 3 at the lower end thereof. The front fork 5 includes two branches between which a front wheel 6 is rotatably supported. Thus, when the handle bar 1 is rotatably turned, the front wheel 6 is rotated in the same direction through the stem pipe 3 and the front fork 5.

Figure 6:
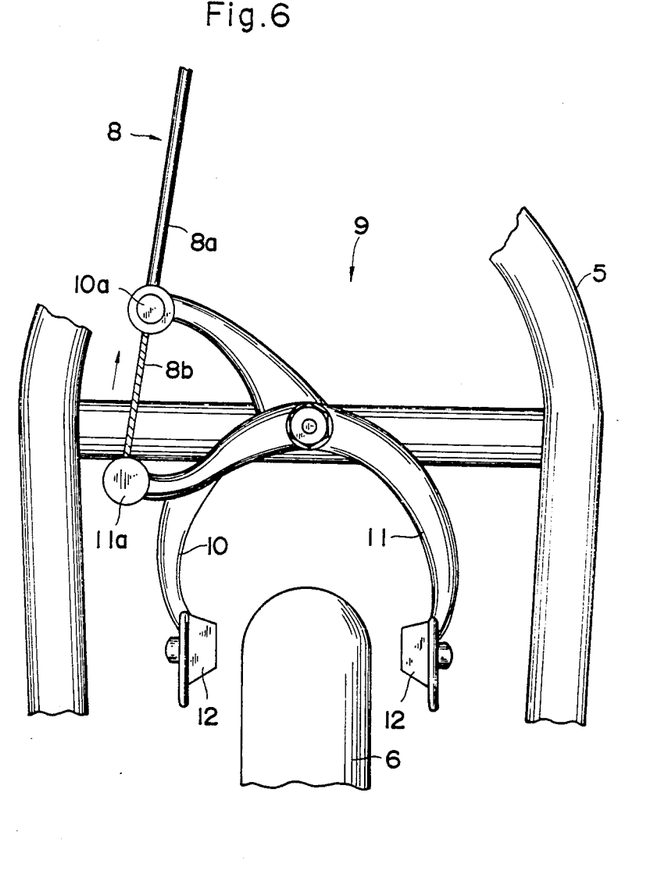
FIG. 6 is a view showing a brake mechanism for a front wheel.

A front brake lever 7 for the front wheel 6 is mounted in the proximity of a knob 1a on the left side of the handle 1 and includes a brake cable 8 for the front wheel 6 one end of which is connected thereto. The brake cable 8 passes through the stem pipe 3 and the front fork 5 and the other end thereof is connected to a brake mechanism 9 adapted to brake the front wheel. The brake mechanism 9, as shown in FIG. 6, includes a substantially semi-circular arm 11 having a regulator 10a to which a terminal end of a sheathing 8a of the cable 8 is connected and another substantially semi-circular arm 11 having a movable, portion 11a to which is connected a terminal end of a core line 8b extending from the sheathing 8a. Each of brake shoes 12, 12 is fixed to the opposite end of each of the arms 10, 11. The arms 10, 11 are journaled to the front fork 5 and are biased by spring means (not shown) away from each other. As a result, depressing of the front brake lever 7 pulls the core line 8b in the sheathing 8a connected to the regulator 10a in the direction shown by the arrow in FIG. 6 to rotate the movable portion 11a toward the regulator 10a so that the respective ends of the arm 10, 11 are close enough to each other to have both of the brake shoes 11, 12 abut against the front wheel 6. Subsequently, the front wheel 6 comes into sliding contact with the brake shoes 12, 12 and this prevents the rotation of the former. As aforementioned, the cable 8 leads through the stem pipe 3, steering head 4 and the front fork 5 so that the cable does not become entangled in the stem pipe 3 and the steering head 4 when the front wheel 6 is rotated by turning the handle bar 1 during trick riding.

Figure 1:
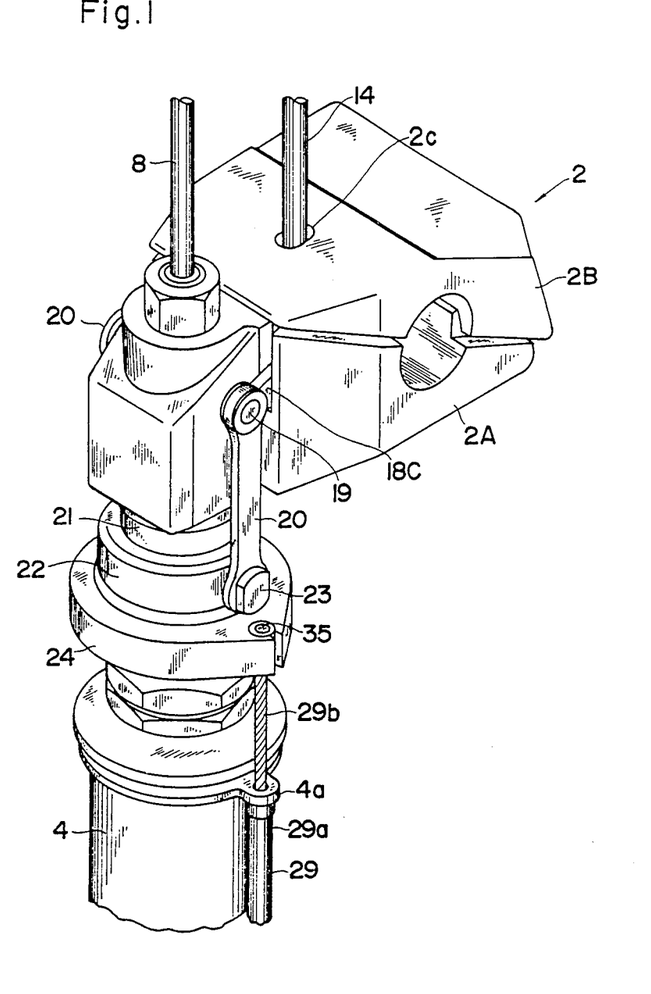
FIGS. 1 and 2 are perspective and exploded perspective views each showing the essential part of a brake apparatus according to the invention.
Figure 2:
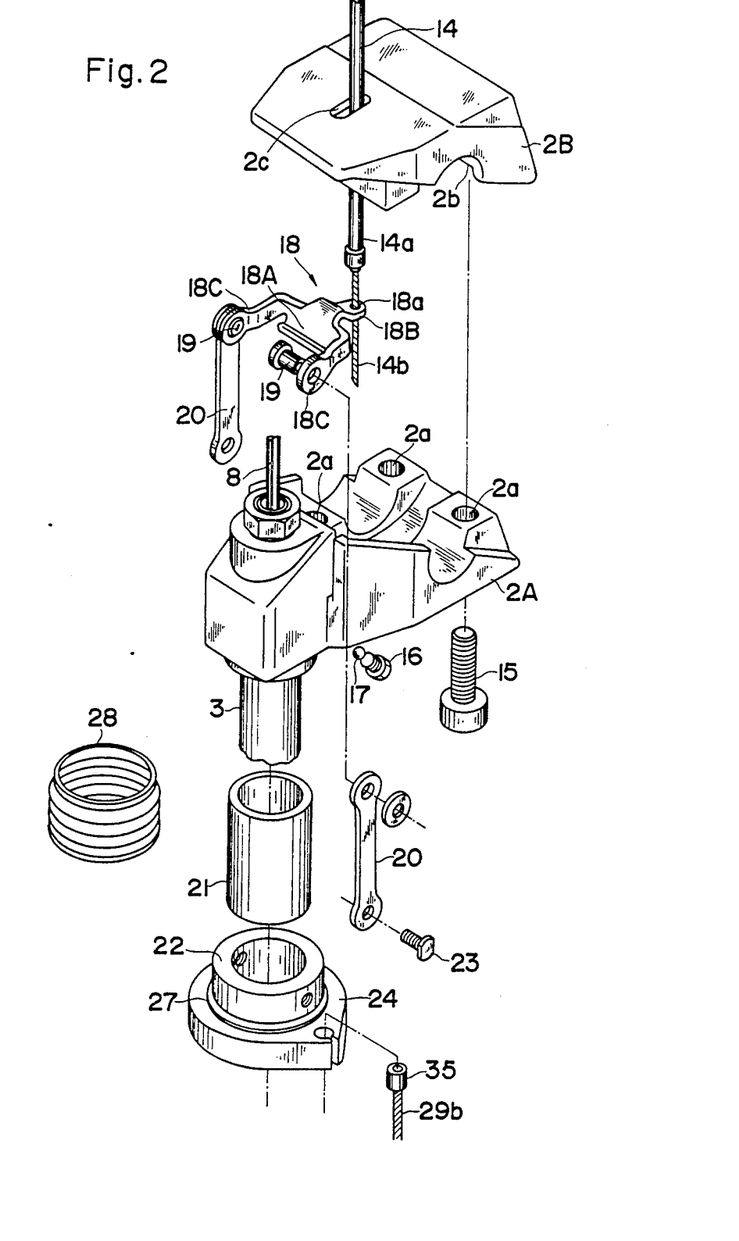
Figure 3:
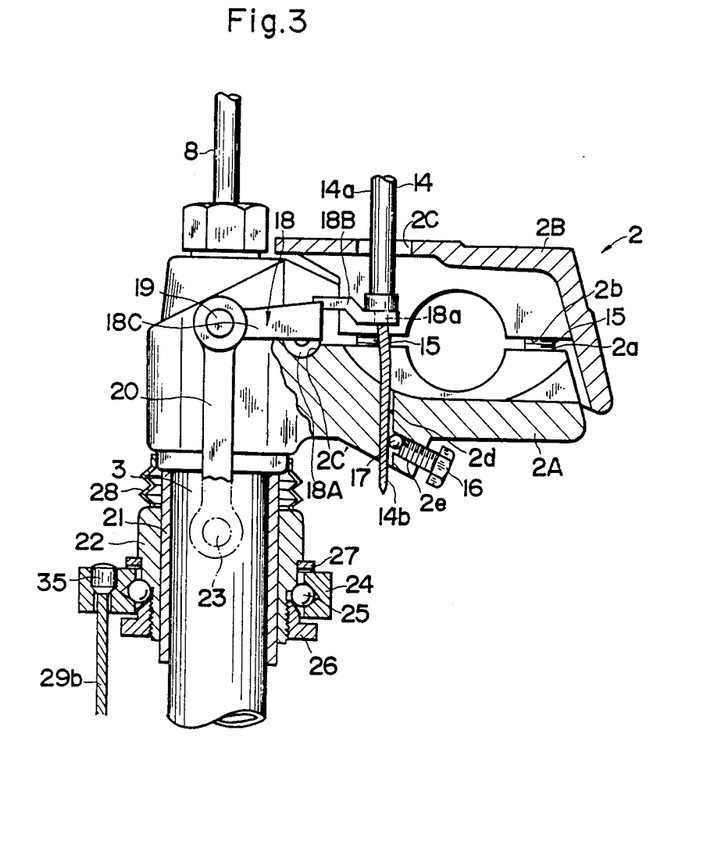
FIG. 3 is a side view of the brake apparatus with parts broken away.

A brake apparatus according to the invention, as shown in FIG. 5, is provided with a rear brake lever 13 for braking the rear wheel, which is mounted in the proximity of a knob 1b on the right side of the handle 1. The rear brake lever 13 is supplied with a first cable 14 for braking the rear wheel, one end of which is connected thereto and the other end being extended in the stem 2. The stem 2, as shown in FIGS. 1, 2 and 3, provides a stem head 2A over which a bracket 2B is mounted. The stem head 2A is provided with a plurality of vertical through holes 2a and includes threaded openings 2b each of which are formed in a position corresponding to the respective through holes. Clamping bolts 15 are inserted into the through holes 2a and screwed into the threaded openings 2b in the bracket 2B to secure the latter to the stem head 2A. The bracket 2B is provided with a guide opening 2C through which the other end of the first cable 14 for the rear wheel is guided. A core line 14b extended from a sheathing 14a of the cable 14 for the rear wheel is inserted into an insert hole 2d in communication with a threaded opening 2e into which a locking bolt 16 is threaded. A ball member 17 is forced against the core line 14b by clamping the locking bolt 16 to lock the core line 14b in position on the stem head 2A.

An engageable recess 2C' of semi-circular cross section is formed on the surface of the stem head 2A at the root thereof and engages a greased curved portion 18A of a rocking member 18. A through hole 18a is bored through a projection 18B which protrude from the curved portion 18A of the rocking member 18. The core line 14b of the cable 14 extends through the through hole 18a. The end face of the sheathing 14a of the cable 14 abuts against the projection 18B. Consequently, upon applying the rear brake lever 13 the sheathing 14a of the cable 14 is lowered to depress the projection 18B, rocking the rocking member 18 on the axis of the engageable recess 2C'. A pair of arms 18C, 18C oppositely extend from the curved portion 18A of the rocking member 18. A pair of links 20, 20 are adapted to pivotally support the respective ends thereof on the arms 18C, 18C by means of pin 19. These links 20, 20 extend downwardly along the stem pipe 3. A bush 21 formed of tetrafluoroethylene or the like is mounted over the stem pipe 3 and includes a vertically moving member 22 slidably mounted over the bush 21. The upper end of the vertically moving member 22 is pivoted by set bolts 23 to the links 20, 20 at the other ends thereof at an interval of 180°. A rotary member 24 is rotatably mounted on the vertically moving member 22 on the periphery thereof with a race 25 therebetween. A cone 26 with a flange is threaded into a threaded groove formed in the lower periphery of the vertically moving member 22 to hold the ball members 25 in position. A seal ring 27 is provided on the upper end face of the rotary member 24.

A bellows 28 is disposed between the underside of the stem 2 and the upper end face of the vertically movable member 22 to prevent dust and the like from interposing therebetween.

Figure 4:
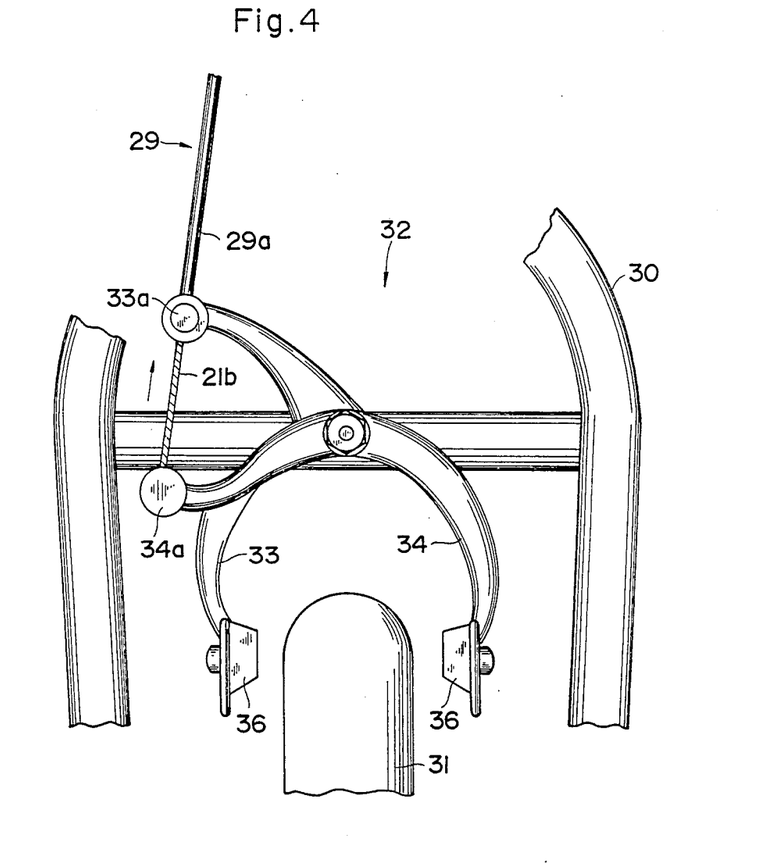
FIG. 4 is a view showing a brake mechanism for a rear wheel

A core line 29b at the one end of a second cable for the rear wheel is connected by a metal fitting 35 to the projection of the rotary member 24. A sheathing 29a of the cable 29, as shown in FIG. 1, abuts against the underside of a bulge 4a formed at the upper end of the steering head. The second cable 29, as shown in FIG. 4, leads to the side of a rear fork 30. The rear fork 30 is divided into two branches the distal ends of which have a rear wheel 31 rotatably journaled thereto. A rear brake mechanism 32 for braking the rear wheel 31 comprises a substantially semicircular arm 33 with a regulator 33a to which the terminal of the sheathing 29a of the second brake cable 29 for the rear wheel 29 is connected, and another substantially semi-circular arm 34 having a movable portion 34a to which the terminal of the core line 29b is fixed. Brake shoes 36, 36 are rigidly mounted onthe opposite ends of the arms 33, 34. The arms 33, 34 are pivoted on the rear fork and enerized by spring means (not shown) in the direction of moving away from each other.

Operation of the brake apparatus according to the present invention will now be explained.

When the rear brake lever 13 is depressed, the sheathing 14a of the first cable 14 for the rear wheel is lowered to depress the projection 18B of the rocking member 18 so that the latter swivels, upwardly moving the pair of arms, 18C, 18C. Upward movement of the pair of arms 18C, 18C also lifts the pair of links 20, 20 so that the vertically movable member 22 as well as the rotary member 24 is raised above the bush 21, thereby upwardly lifting the core line 29b of the second cable 29 for the rear wheel 29. In the brake mechanism 32 for the rear wheel, the movable portion 34a is, therefore, rotated toward the regulator 33a to bring the respective ends of the arms 33, 34 close to each other, thereby pressing both of the brake shoes 36, 36 against the rear wheel 31. Accordingly, the rear wheel 31 is prevented from rotating by the slidable engagement of the wheel with the brake shoes 36, 36. As above set forth, when the vertically movable member 22 is supported at opposite sides, namely, two points by the pair of links 20, 20, it is possible to apply uniform force to the vertically movable member 22 for vertical movement as compared with one point support. This will facilitate operation of the brake lever in a smooth fashion and secure operation of the brake mechanism. The rocking member 18 is disposed in the stem 2 in order to prevent such accidents as a portion of cloth or the rider's fingers being nipped by the rocking member 18 and associated components when the brake lever 13 is operated, thus ensuring safe running.

On the other hand, the front wheel 6 is rotated by operation of the handle 1 in a trick bicycle riding imparts its rotational force to the vertically movable member 22 via the stem 2, the pair of the arms 18C, 18C of the rocking member 18 therein, and the pair of the links 20, 20. The terminal of the core line 29a of the second cable 29 for the rear wheel is coupled to the rotary member 24 rotatably fitted into the vertically movable member 22 so that rotation of the rotary member 24 is restricted by the core line 29a. The vertically movable member 22 and the first cable 14 for the rear wheel as well as the handle 1 are ohly rotated in rotating the front wheel 6 to thus hold the rotary member 24 in a non-rotatable condition. Accordingly, the first and second cables 14, 29 for the rear wheel are prevented from being entangled in the stem pipe 3 and the steering head 4.

The embodiment has been described with reference to the bush 21 which is dimensioned, as shown in FIG. 3, to be longer than a stroke required for vertical movement of the vertically movable member 22. The lower end face of the bush 21 abuts against the upper end face of the steering head 4 to insert the stem pipe 3 in the steering head 4. Consequently, if the bush 21 is dimensioned to provide a length corresponding to the length with which the stem pipe 3 is inserted, the stem pipe 3 may be positioned in the steering head 4 by only inserting the stem pipe 3 in the steering head 4 in a drop manner.

Figure 7:
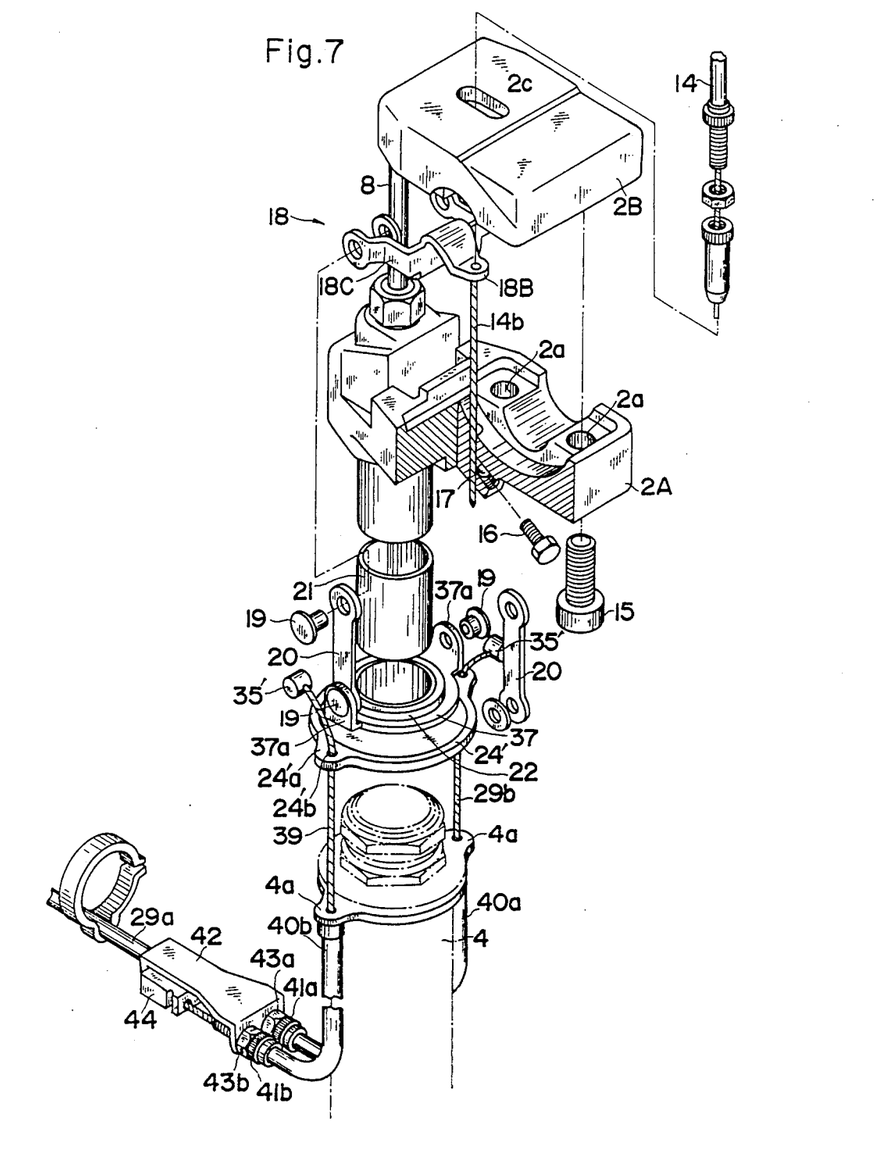
FIG. 7 is an exploded perspective view of the brake apparatus according to another embodiment of the invention.
Figure 8:
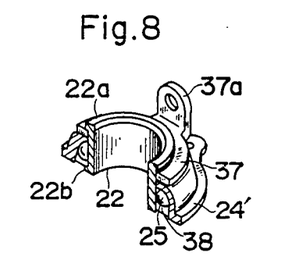
FIG. 8 is a partial perspective view, partly in section, of the FIG. 7 embodiment.
Figure 9:
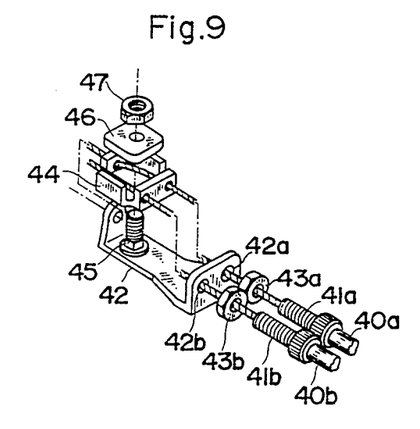
FIG. 9 is an exploded partial perspective view of the FIG. 7 embodiment.

FIGS. 7, 8 and 9 depicts another embodiment of the invention. In this embodiment, an outwardly extending annular bulge portion 22a, as shown in FIG. 8, is mounted on the upper periphery of the vertically movable member 22 fitted into the bush 21. A ring member 37 is rotatably mounted on the bulge portion 22a. A pair of a connecting bars 37a, 37a are formed at a position in opposition to the ring member 37. The respective lower ends of the links 20, 20 are coupled by the pin 19 to the connecting bars 37a, 37a. A rotary member 24' is rotatably mounted on the periphery of the vertically movable member 22 to hold the ball member 25 therebetween. Another ring member 38 adapted to hold the ball member 25 engages the bulge portion 22b on the lower periphery of the vertically movable member.

A pair of projections 24'a, 24'a are disposed in a position opposed to the rotary member 24' and are provided with through holes 24'b, 24'b through one of which the core line 29b of the second cable 29 for the rear wheel passes. A metal fitting 35' which is retained by the projection 24'b is attached to the terminal of the core line 29b. An auxiliary core line 39 passes through the other through hole 24'b and includes the terminal to which the metal fitting 35' is also attached. On the other hand, a pair of projections 4a, 4a are mounted on the upper end of the steering head 4 and have the undersides against which the respective end faces of the sheathings 40a, 40a abut. Coupling bolts 41a, 41a are mounted on the lower ends of the sheathings 40a, 40a and are threaded in threaded holes 42a, 42b in a coupling member 42. The coupling bolts 41a, 41a are fixed to the coupling member 42 by threading nuts 43a, 43b into the bolts.

The core line 29b of the second cable 29 for the rear wheel and the auxiliary core line 39 pass through the sheathings 40a, 40b to extend from the coupling bolts 41a, 41b. As shown in FIG. 9, the core line 29b and the auxiliary core line 39 further pass through a movable member 44 and are fast with the movable member 44 by threading a nut 47 into a clamp bolt 45, over a washer 46, which passes through the center of the member 44. Only the core line 29b further extends from the movable member 44 and is inserted into the sheathing 29a of the second cable 29 for the rear wheel. The end rim of the sheathing 29a abuts against the bend portion of the coupling member 42.

With this arrangement, when the brake lever 13 for the rear wheel is operated to lift the pair of the links 20, 20, not only the vertically movable member 22 is vertically moved by applying a uniform force thereto but also the rotary member 24' is also vertically moved with the vertically movable member 22 similarly subjected to an uniform force since the rotary member 24' includes at the two points thereof the core line 29b and the auxiliary core line 39 connected thereto. Accordingly, this will facilitate smooth operation of the brake lever 13 and ensure operation of the brake mechanism 32.

What is claimed is:

1. In a bicycle including a stem for supporting the center of a handle, a steering head into which a stem pipe is rotatably inserted, a brake apparatus including a rear wheel brake lever mounted on said handle, and a rear wheel brake mechanism having brake shoes in a slidable contact with the side of a rear wheel, the improvement comprising a rocking member swingably disposed in said stem and having a pair of arms extending from said stem; a first cable having one end coupled to said rear wheel brake lever and an opposite end extending into the interior of said stem to swivel said rocking member in response to depressing of said rear wheel brake lever; a pair of links having first ends respectively pivotally secured to said pair of said arms; a vertically movable member arranged coaxially with said stem pipe and wherein second ends of said pair of links are respectively pivotally secured thereto; a rotary member rotatably mounted to said vertically movable member; and a second cable having one end coupled to said rotary member and an other end connected to said rear wheel brake mechanism, wherein depressing of said rear wheel brake lever swivels said rocking member through the first cable to move said pair of links and thereby move the vertically movable member and the rotary member along the stem pipe to cause movement of the second cable actuating the rear wheel brake mechanism.

2. A bicycle as claimed in claim 1, further including a bush mounted over said stem pipe and adapted to have its lower end face engage an upper end face of said steering head, said vertically movable member being mounted on said bush.

3. A brake apparatus for bicycles as claimed in claim 2 wherein said stem pipe includes a portion which is positioned between the underside of said stem and said vertically movable member and which is covered by a bellows member.

4. A brake apparatus for bicycles as claimed in claim 1 wherein said stem pipe includes a portion which is positioned between the underside of said stem and said vertically movable member and which is covered by a bellows member.

5. The brake apparatus of claim 1, wherein said pair of links are diametrically opposed to each other about the rotary member to uniformly exert a force moving said rotary member to actuate the rear wheel brake mechanism.

* * * * *